(12) United States Patent
Hallot

(10) Patent No.: US 9,738,761 B2
(45) Date of Patent: Aug. 22, 2017

(54) INJECTION MOULDED POLYPROPYLENE ARTICLES

(71) Applicant: INEOS EUROPE AG, Rolle (CH)

(72) Inventor: Gaetane Hallot, Grimbergen (BE)

(73) Assignee: INEOS EUROPE AG, Vaud (CH)

( * ) Notice: Subject to any disclaimer, the term of this patent is extended or adjusted under 35 U.S.C. 154(b) by 70 days.

(21) Appl. No.: 14/762,729

(22) PCT Filed: Jan. 28, 2014

(86) PCT No.: PCT/EP2014/051581
§ 371 (c)(1),
(2) Date: Jul. 22, 2015

(87) PCT Pub. No.: WO2014/118149
PCT Pub. Date: Aug. 7, 2014

(65) Prior Publication Data
US 2015/0322215 A1 Nov. 12, 2015

(30) Foreign Application Priority Data
Jan. 29, 2013 (EP) ..................................... 13153054

(51) Int. Cl.
*C08J 5/00* (2006.01)
*C08L 23/12* (2006.01)
*C08L 23/14* (2006.01)
*C08L 23/16* (2006.01)
*C08K 5/00* (2006.01)

(52) U.S. Cl.
CPC ............... *C08J 5/00* (2013.01); *C08K 5/0083* (2013.01); *C08L 23/12* (2013.01); *C08L 23/14* (2013.01); *C08L 23/16* (2013.01); *C08J 2323/12* (2013.01); *C08J 2423/08* (2013.01); *C08J 2423/14* (2013.01); *C08L 2203/18* (2013.01)

(58) Field of Classification Search
CPC ...... C08J 5/00; C08J 2323/12; C08J 2423/08; C08J 2423/14; C08L 23/04; C08L 23/10; C08L 23/12; C08L 23/14; C08L 23/16; C08L 2203/18; C08K 5/0083
USPC ........................................................ 524/397
See application file for complete search history.

(56) References Cited

U.S. PATENT DOCUMENTS

2004/0039124 A1    2/2004  Delaite et al.
2011/0301265 A1*  12/2011  Brunner .................. C08L 51/06
                                                    524/91
2012/0276312 A1   11/2012  Crown et al.

FOREIGN PATENT DOCUMENTS

WO    WO 2007/003523 A1    1/2007
WO    WO 2011/160953 A1   12/2011

* cited by examiner

Primary Examiner — Angela C Scott
(74) Attorney, Agent, or Firm — Nixon & Vanderhye P.C.

(57) ABSTRACT

Injection molded article made from a composition containing 81-88 wt % of a propylene homopolymer (A) having a melt flow rate of between 1 and 2 g/10 min, 12-19 wt % of a propylene-ethylene copolymer (B) containing 45-65 wt % of ethylene, and 50-10000 ppm by weight of a nucleating agent. The total ethylene content of the composition is 6-10 wt %, and the melt flow rate (MFR) of the composition is 0.7-2 g/10 min.

9 Claims, No Drawings

INJECTION MOULDED POLYPROPYLENE ARTICLES

This application is the U.S. national phase of International Application No. PCT/EP2014/051581 filed Jan. 28, 2014 which designated the U.S. and claims priority to European Patent Application No. 13153054.5 filed Jan. 29, 2013, the entire contents of each of which are hereby incorporated by reference.

The present invention relates in general to polypropylene-based moulded articles, in particular injection moulded articles, and to polypropylene compositions suitable for such articles.

Pipes suitable for transporting liquids and gases and the fittings therefor are typically made from one of several compositions: poly-1-butene, cross-linked polyethylene (peroxide crosslinked, silane crosslinked or radiation cross-linked), non-crosslinked polyethylene, especially high density polyethylene, and certain types of polypropylene. There are disadvantages associated with all of these. Poly-1-butene works well, but is a more expensive composition for pipes. Cross-linked polyethylene is also expensive. Polypropylenes, especially homopolymers, are less expensive but are generally not sufficiently resistant to long term heat and pressure, and also tend to be too rigid and fragile. Propylene random copolymers are typically more resistant to heat and pressure, but generally have poor impact resistance at very low temperature.

Similar considerations apply to materials used to make large injection moulded articles such as fittings associated with the transport of liquids and gases (eg manhole covers), where excessive rigidity and brittleness are a disadvantage.

It is known to blend polypropylene homopolymers and random copolymers with other propylene-based materials in order to modify their properties. In particular it is known to blend polypropylene homopolymers and random copolymers with polypropylene rubbers, which are propylene-ethylene copolymers containing a high proportion of ethylene. Such blends are less rigid that pure homopolymers or random copolymers due to the presence of the rubber phase.

WO2011/160953 discloses polypropylene compositions suitable for producing pipes, tubes and fittings comprising 7-19 wt % of a propylene-hexene copolymer and 81-93 wt % of a heterophasic polypropylene which itself comprises 86-95 wt % of a propylene homopolymer and 5-14 wt % of a propylene-ethylene copolymer. In one Example, the heterophasic polypropylene has a total ethylene content of 4.8-5.5 wt % and an $MFR_5$ of 0.8-1.3 g/10 min. For polypropylene, the $MFR_5/MFR_2$ ratio is about 3.5-4, and therefore this corresponds to an $MFR_2$ of below 0.4 g/10 min.

Our own WO 02/038670 discloses pipes obtained from a polypropylene composition comprising from 80-97 wt % of a propylene homopolymer (A) having an isotacticity index of at least 0.96, and 3-20 wt % of a random copolymer of propylene (B) containing from 45-70 wt % of units of ethylene and/or a C4-C8 alpha-olefin. The composition has a melt flow rate of 0.3-0.6 g/10 min, and may contain a nucleating agent such as sodium benzoate. The pipes have an elastic modulus of 1400-2000 MPa. The pipes are said to have improved rigidity and good impact resistance. There is no mention of pipe fittings.

Two issues which are important for injection moulded articles and which are therefore not addressed in WO 02/038670 are shrinkage and processability. An injection moulded article must have sufficient processability, in particular injectability, to be suitable for injection moulding. At the same time it must not suffer from excessive shrinkage upon cooling and solidifying. As well as good processability and resistance to shrinkage, fittings intended specifically for pipes additionally need to have similar properties to those required for pipes themselves. We have now found that it is possible to make injection moulded articles such as pipe fittings which have a good balance of impact resistance and rigidity and also good processability and low shrinkage.

Accordingly in a first aspect the present invention provides an injection moulded article made from a composition comprising:

81-88 wt % of a propylene homopolymer (A) having a melt flow rate of between 1 and 2 g/10 min;

12-19 wt % of a propylene-ethylene copolymer (B) containing 45-65 wt % of ethylene, and 50-10000 ppm by weight of a nucleating agent, wherein the total ethylene content of the composition is 6-10 wt %, and the melt flow rate (MFR) of the composition is 0.7-2 g/10 min.

The nucleating agent is preferably an inorganic nucleating agent, an organic nucleating agent or a polymeric nucleating agent. Organic nucleating agents are preferred.

Specific organic nucleating agents which may be used include sodium benzoate, disodium hexahydrophthalate, 1,3-O-2,4-bis(3,4-dimethylbenzylidene) sorbitol (also known as DMDBS), available from Milliken Chemical as Millad®3988, sodium 2,2'-methylene-bis-(4,6-di-tert-butylphenyl)phosphate (available from Asahi Denka Kogyo KK as NA-11), aluminum bis[2,2'-methylene-bis-(4,6-di-tert-butylphenyl)phosphate] (available from Asahi Denka Kogyo KK as NA-21) and talc.

We have found that particularly low shrinkage can be obtained if the nucleating agent is a calcium, strontium, monobasic aluminum or lithium salt of hexahydrophthalic acid, and in particular the calcium salt of 1,2 cyclohexane dicarboxylic acid, available from Milliken Chemical as HPN-20E.

The amount of nucleating agent is preferably 50-1000 ppm, more preferably 100-500 ppm.

It is preferred that the composition from which the articles of the invention are made has an MFR of 0.7 to 1.5 g/10 mins, and more preferably 0.7-1.3 g/10 mins. The most preferred range is 0.7-1.2 g/10 mins. The melt flow rate is measured under a load of 2.16 kg at 230° C. according to ISO 1133.

The composition preferably has a spiral flow of greater than 300 mm, preferably greater than 320 mm. The maximum spiral flow is preferably 500 mm, more preferably 450 mm. A preferred range is 320-450 mm. Spiral flow is measured on a FANUC S150iA with a stock temperature of 230° C., an injection pressure of 1000 bar, an injection speed of 20 mm/s, a mould temperature of 40° C., and a wall thickness of the spiral mould of 2 mm.

The amount of propylene-ethylene copolymer (B) in the composition is preferably at least 14 wt %. It is preferred that it does not exceed 17 wt %. Independently the copolymer preferably contains 50-60 wt % of ethylene, and more preferably 52-58 wt % of ethylene.

The total ethylene content of the composition is preferably 6.5-9.5 wt %, more preferably 7-9.5 wt %.

Ethylene content is determined by Fourier transform infrared spectrometry on a pressed film of the composition having a thickness of 200 μm. Absorption bands at 732 and 720 $cm^{-1}$ are used to determine the ethylene content.

The ethylene content of copolymer (B) expressed in % in weight in relation to the total weight of polymer (B) is determined by applying the following equation: C2(B)=total C2*100/[B] wherein [B] represent the weight fractions of B in the composition and taking into account that fraction (A) contains no ethylene.

The proportion of fraction (B) in the final composition is determined by comparing the level of catalyst residues in fraction (A), which can be determined on a sample taken from the reactor, with that in the final composition (i.e. fraction (A)+fraction (B)), on the assumption that fraction (B) is free of catalyst residues, since no additional catalyst has been added during the production of fraction (B).

The composition of the invention preferably has a content of xylene soluble fraction of between 10 and 18 wt %, more preferably between 12 and 15 wt %.

The xylene soluble fraction (Xs) of the composition preferably has an intrinsic viscosity η (Xs) of 0.1-0.6 l/g, more preferably 0.2-0.5 l/g. It is determined by putting 3 g of polymer in a solution in 200 ml of metaxylene at boiling temperature, cooling the solution to 25° C. by immersion in a water bath and maintaining the solution at that temperature for 1 h, and filtering the soluble fraction at 25° C. on filter paper.

The xylene soluble fraction (Xs) of polymer (B) can be determined from the equation Xs=Xs (A)*[A]/100+Xs (B)*[B]/100 in which Xs represents the xylene soluble fraction of the composition comprising A and B and [A] and [B] represent the weight fractions of A and B in the composition.

The xylene insoluble fraction of the composition preferably has an intrinsic viscosity η(Xins) of 0.1-0.6 l/g, more preferably 0.1-0.3 l/g.

Intrinsic viscosity (η) is measured according to the principles of ISO1628-1, in tetralin at 140° C. The intrinsic viscosity of (B) and the ratio of the intrinsic viscosity of polymer (B) to polymer (A) can be determined from the equation η=η(A)*[A]/100+η(B)*[B]/100, in which η represents the viscosity of the composition comprising A and B and [A] and [B] represent the weight fractions of A and B. The composition preferably has a flexural modulus of at least 1200 MPa, more preferably at least 1300 MPa. The most preferred range is 1400-1600 MPa. Flexural modulus is measured at 23° C. on an injected test piece of a thickness of 4 mm according to ISO178.

The composition preferably has a notched IZOD impact resistance of at least 5.5 kJ/m$^2$ preferably at least 6.0 kJ/m$^2$ at −20° C., measured according to ISO180/1A. The specimens were prepared according to ISO1873-2.

The composition preferably has a shrinkage in the perpendicular direction less than 1%.

The composition preferably has a shrinkage in the parallel direction of no more than 1.8%.

Parallel and perpendicular shrinkage are measured on 2 mm thick engraved plaques injected on a FANUC S150iA injection moulding machine. Dimensional measurements are performed with a laser autofocus video measurement (NIKON NEXIV-200).

Preferably, propylene homopolymer (A) and propylene-ethylene copolymer (B) together make up at least 95 wt %, more preferably at least 98 wt % of the polymer content of the composition. It is most preferred that they make up substantially all of the polymer content of composition. The polymer content of the composition may also include up to 5 wt % of other polymers, but this is not preferred.

In addition to the nucleating agent, the non-polymer content of the composition may include other additives, preferably amounting to no more than 5 wt % in total based on the weight of the overall composition. Such additives include fillers, stabilizers, pigments, antacids or nucleation agents.

The composition that of the present invention can be obtained by any appropriate technique. One can, for example, mix the homopolymer (A) and the copolymer (B) and possible additives together according to any known process whatsoever, such as a melt mixture of the two preformed polymers. However, processes during which the polymers (A) and (B) are prepared in two successive stages of polymerization are preferred. The polymer thus obtained is generally called a sequenced propylene copolymer. Generally, the homopolymer (A) is first prepared, and then the copolymer (B) is prepared in the presence of the homopolymer (A) from the first stage. These stages can each be done independently of each other, in a suspension, in an inert hydrocarbon diluent, in propylene maintained in the liquid state or even in the gaseous state, on an agitated bed or on a fluid bed.

The composition of the invention may be made by any conventional process. However it is advantageously produced in a gas phase polymerisation process. Gas-phase or vapour-phase olefin polymerisation processes are disclosed generally in "Polypropylene Handbook" pp. 293-298, Hamer Publications, NY (1996), and more fully described in "Simplified Gas-Phase Polypropylene Process Technology" presented in Petrochemical Review, March, 1993.

A gas-phase reactor system may function as a plug-flow reactor in which a product is not subject to backmixing as it passes through the reactor, such that conditions at one part of the reactor may be different from conditions at another part of the reactor. An example of a substantially plug-flow system is a horizontal, stirred, subfluized bed system such as described in U.S. Pat. No. 3,957,448; U.S. Pat. No. 3,965,083; U.S. Pat. No. 3,971,768; U.S. Pat. No. 3,970,611; U.S. Pat. No. 4,129,701; U.S. Pat. No. 4,101,289; U.S. Pat. No. 4,130,699; U.S. Pat. No. 4,287,327; U.S. Pat. No. 4,535,134; U.S. Pat. No. 4,640,963; U.S. Pat. No. 4,921,919, U.S. Pat. No. 6,069,212, U.S. Pat. No. 6,350,054; and U.S. Pat. No. 6,590,131. It is preferred that the reactor system used to make the compositions of the present invention functions as a plug-flow reactor.

The term "plug-flow reactor" refers to reactors for conducting a continuous fluid flow process without forced mixing at a flow rate such that mixing occurs substantially only transverse to the flow stream. Agitation of the process stream may be desirable, particularly where particulate components are present; if done, agitation will be carried out in a manner such that there is substantially no back-mixing. Perfect plug flow cannot be achieved because the diffusion will always lead to some mixing, the process flow regime being turbulent, not laminar. Since perfect plug flow conditions are not achieved in practice, a plug flow reactor system sometimes is described as operating under substantially plug flow conditions. Depending on manufacturing process conditions, various physical properties of olefin polymers may be controlled. Typical conditions which may be varied include temperature, pressure, residence time, catalyst component concentrations, molecular weight control modifier (such as hydrogen) concentrations, and the like.

The catalyst system used in the process of the invention is preferably a Ziegler-Natta catalyst system. Typical Ziegler-Natta catalyst systems contain a transition-metal (typically IUPAC a Group 4-6 metal) component, preferably a titanium-containing component, together with an organometallic compound such as an aluminum alkyl species. A typical and preferable titanium-containing component is a titanium halide compound, based on titanium tetrahalide or titanium trihalide, which may be supported or combined with other material. These systems are now well-known in the art. The solid transition metal component typically also contains an electron donor compound to promote stereospecificity. The supported titanium-containing olefin polymerisation catalyst component is usually formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; the reaction product of a magnesium halide such as magnesium chloride or magnesium bromide with an organic compound, such as an alcohol or an organic acid ester, or with an organometallic compound of metals of Groups 1, 2, or 13; magnesium alcoholates; or magnesium alkyls.

Suitable solid supported titanium catalyst systems are described in U.S. Pat. No. 4,866,022, U.S. Pat. No. 4,988,656, U.S. Pat. No. 5,013,702, U.S. Pat. No. 4,990,479 and U.S. Pat. No. 5,159,021.

In a typical supported catalyst useful for preparing the propylene copolymers of the present invention, the magnesium to titanium molar ratio may range from 1:1 to 30:1, more preferably from 10:1 to 20:1. The internal electron donor components are typically incorporated into the solid, supported catalyst component in a total amount ranging up to about 1 mole per mole of titanium in the titanium compound. Typical amounts of internal donor are from 0.01 to 1 moles per mole of titanium.

The solid titanium-containing component preferably 1-6 wt % titanium, 10-25 wt % magnesium, and 45-65 wt % halogen. Typical solid catalyst components contain 1-3.5 wt % titanium, 15-21 wt % magnesium and from 55-65 wt % chlorine.

Preferred internal electron donor compounds include esters of aromatic acids. Electron donors of mono- and dicarboxylic acids and halogen, hydroxyl, oxo-, alkyl-, alkoxy-, aryl-, and aryloxy-substituted aromatic mono- and dicarboxylic acids are preferred. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate and d-n-butylphthalate. Other useful internal donors are substituted diether compounds, esters of substituted succinic acid, substituted glutaric acid, substituted malonic acid, and substituted fumaric or maleic acids.

The co-catalyst component preferably is an organoaluminum compound that is halogen free. Suitable halogen-free organoaluminum compounds include, for example, alkylaluminum compounds of the formula $AlR_3$, where R denotes an alkyl radical having 1 to 10 carbon atoms, such as, for example, trimethylaluminum (TMA), triethylaluminum (TEA) and triisobutylaluminum (TIBA).

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, mineral acids, organometallic chalcogenide derivatives of hydrogen sulphide, various phosphorus acid esters and amides, and the like. Mixtures of organic electron donors also may be used.

Particularly preferred external electron donor materials include organic silicon compounds, such as silanes having the formula $Si(OR)_nR'_{4-n}$ where R and R' are selected independently from $C_1$-$C_{10}$ alkyl and cycloalkyl groups and n=1-4. Preferably, the R and R' groups are selected independently from $C_2$ to $C_6$ alkyl, cycloalkyl and heteroalkyl groups such as ethyl, isobutyl, isopropyl, cyclopentyl, cyclohexyl, dialkylamino and the like. Examples of suitable silanes include tetraethoxysilane (TEOS), dicyclopentyldimethoxysilane (DCPDMS), diisopropyldimethoxysilane (DIPDMS), diisobutyldimethoxysilane (DIBDMS), isobutylisopropyldimethoxysilane (IBIPDMS), isobutylmethyldimethoxysilane (IBMDMS), cyclohexylmethyldimethoxysilane (CHMDMS), di-tert-butyldimethoxysilane (DTBDMS), n-propyltriethoxysilane (NPTEOS), isopropyltriethoxysilane (IPTEOS), octyltriethoxysilane (OTEOS), diethylaminotriethoxysilane (DEATEOS) and the like. The use of organic silicon compounds as external electron donors is described, for example, in U.S. Pat. No. 4,218,339; U.S. Pat. No. 4,395,360; U.S. Pat. No. 4,328,122; and U.S. Pat. No. 4,473,660.

A typical catalyst system for the polymerization or copolymerization of alpha olefins is formed by combining a supported magnesium- or titanium-containing catalyst or catalyst component and an alkyl aluminum compound as a co-catalyst, together with at least one external modifier which typically is an electron donor and, preferably, is a silane. Thus for the process of the present invention, a particularly preferred catalyst system comprises a Ziegler-Natta catalyst, an alkyl aluminium compound as cocatalyst, and a silane as external modifier. It is preferred that the solid magnesium- or titanium-containing component is added to the first reactor of a multi-reactor system in conjunction with, but separately from, the aluminum alkyl co-catalyst component and additional modifier components. Separation of the catalyst and co-catalyst components is desirable to avoid polymerisation if monomer is present in the catalyst feed lines. Typically, catalyst components are injected into a polymerisation gas-phase reactor in liquid monomer.

Details of preferred catalysts can also be found in U.S. Pat. No. 4,988,656.

The compositions of the present invention are suitable for making injection-moulded articles such as pipe fittings or manhole covers. The injection-moulded articles can be prepared by well-known processes.

EXAMPLES

Examples 1 and 2 were made in a two reactor continuous polymerisation reactor system. Each of the two reactors was a horizontal, cylindrical reactor measuring 2.7 m in diameter and 16 m in length containing a horizontal stirrer. An inter-stage gas exchange system was located between the two reactors which were capable of capturing first reactor polymerisation product, being vented to remove first reactor gas, and then refilled with fresh gas. This gas exchange system was present in order to preserve different gas compositions in each reactor stage. Both reactors were equipped with an off-gas port for recycling reactor gas through a condenser and back through a recycle line to nozzles in the reactor and liquid propylene was used as a quench liquid to help control the temperature of the polymerization reaction.

Polymerisation was initiated by the introduction to the first reactor of a high activity supported titanium containing catalyst component produced according to Example 1 of U.S. Pat. No. 4,988,656 through a liquid propylene-flushed catalyst addition nozzle. Organosilane modifier and a solution of trialkylaluminum co-catalyst-(TEA) were fed separately to the first reactor through different liquid propylene-flushed addition nozzles. During polymerisation, active propylene homopolymer powder was captured from the first reactor and exposed to a series of gas venting and re-pressurization steps, before being added to the second reactor. Hydrogen was fed to each reactor in order to achieve the desired powder melt flow rate (MFR). Ethylene and propylene were fed separately in order to maintain the desired ratio of the two gases. Details of the process conditions are given in Table 1 and polymer properties are shown in Table 2. Example 3 corresponds to example 1 in WO02/38670.

TABLE 1

| EXAMPLE | | 1 | CE2 | CE3 |
|---|---|---|---|---|
| Reactor 1 | | | | |
| Temperature | ° C. | 57 | 57 | 65 |
| Pressure | MPa | 2.3 | 2.3 | 3.2 |
| Silane | | DIPDMS* | DIPDMS* | DCPDMS** |
| Al/Si | mol/mol | 6 | 6 | 2 |
| Al/Ti | mol/mol | 80 | 80 | 75 |
| H2/C3 | mol/mol | 0.006 | 0.0013 | 0.0017 |
| Reactor 2 | | | | |
| Temperature | ° C. | 78 | 78 | 72 |
| Pressure | MPa | 2.2 | 2.2 | 2.0 |
| H2/C3 | mol/mol | 0.006 | 0.0003 | 0.0214 |
| Split | wt % | 15.0 | 7.3 | 8.3 |
| C2/C3 | mol/mol | 0.36 | 0.36 | 0.79 |
| Formulation | | | | |
| IRGANOX1010 | ppm | 1800 | 1800 | 2000 |
| IRGAFOS 168 | ppm | 1800 | 1800 | 1000 |
| HOSTANOX | ppm | — | — | 1000 |
| Calcium stearate | ppm | 800 | — | — |
| Hydrotalcite DHT-4A | ppm | — | 400 | 500 |
| HPN-20E$ | ppm | 300 | — | — |
| Sodium benzoate | ppm | — | 800 | 2000 |

*Diisopropyldimethoxysilane
**Dicyclopentyldimethoxysilane
$HPN-20E—calcium salt of 1,2 cyclohexane dicarboxylic acid

TABLE 2

| EXAMPLE | | 1 | CE2 | CE3 |
|---|---|---|---|---|
| Component A | | | | |
| MFR (A) | g/10 min | 1.5 | 0.3 | |
| [A] | wt % | 85.0 | 92.7 | 91.7 |
| XS (A) | wt % | 1.5 | 1.5 | 1.6 |
| Component B | | | | |
| [B] | wt % | 15.0 | 7.3 | 8.3 |
| C2(B) | wt % | 56 | 56 | 48 |
| XS (B) | wt % | 85 | 87 | 85 |
| Final composition (ex-reactor | | | | |
| MFR | g/10 min | 0.80 | 0.25 | 0.51 |
| C2(tot) | wt % | 8.4 | 4.1 | 4.0 |
| η | dl/g | 0.274 | 0.350 | |
| Xs | wt % | 14.0 | 7.6 | 8.7 |

TABLE 2-continued

| EXAMPLE | | 1 | CE2 | CE3 |
|---|---|---|---|---|
| η(Xs) | dl/g | 0.362 | 0.526 | |
| Viscosity Ratio (η(Xs)./η(Xins)) | | 1.4 | 1.6 | |
| Resin properties (after pelletisation) | | | | |
| Flex Mod 23° C. | MPa | 1460 | 1723 | 1741 |
| Izod 23° C. | kJ/m² | 61 | 69 | |
| Izod −20° C. | kJ/m² | 6.3 | 4.5 | |
| Charpy 23° C. | kJ/m² | 70 | | 80 |
| Charpy −20° C. | kJ/m² | 8.0 | | 4.1 |
| Shrinkage perp. | % | 0.90 | 1.32 | |
| Shrinkage parallel | % | 1.68 | 2.20 | |
| Spiral flow (inj. speed 20 mm/s) | mm | 340 | 265 | |

In the table above it can be seen that the composition of the invention has a higher spiral flow than the comparative example, demonstrating its superior processability for injection moulding. However it still has satisfactory rigidity (flexural modulus) and impact resistance (Izod). The composition of the invention also has reduced shrinkage, thereby showing that it has a good combination of all the properties required for a pipe fitting or other injection moulded article.

The invention claimed is:

1. Injection moulded article made from a composition comprising:
    81-88 wt % of a propylene homopolymer (A) having a melt flow rate of between 1 and 2 g/10 min;
    12-19 wt % of a propylene-ethylene copolymer (B) containing 45-65 wt % of ethylene; and
    50-10000 ppm by weight of a nucleating agent,
    wherein propylene homopolymer (A) and propylene-ethylene copolymer (B) together make up at least 98 wt % of the polymer content of the composition, the total ethylene content of the composition is 6-10 wt %, and the melt flow rate (MFR) of the composition is 0.7-2 g/10 min.

2. Article according to claim 1, wherein the composition has a spiral flow, measured at a rate of 20 mm/s, of greater than 300 mm.

3. Article according to claim 1, wherein the amount of propylene-ethylene copolymer (B) in the composition is 14-17 wt %.

4. Article according to claim 1, wherein copolymer (B) of the composition contains 50-60 wt % of ethylene.

5. Article according to claim 1, wherein the total ethylene content of the composition is 6.5-9.5 wt %.

6. Article according to claim 1, wherein the total ethylene content of the composition is 7-9.5 wt %.

7. Article according to claim 1, wherein the nucleating agent in the composition is sodium benzoate, disodium hexahydrophthalate, 1,3-O-2,4-bis (3,4-dimethylbenzylidene) sorbitol, sodium 2,2'-methylene-bis-(4,6-di-tert-butylphenyl)phosphate, aluminum bis [2,2'-methylene-bis-(4,6-di-tert-butylphenyl)phosphate], and talc, or a calcium, strontium, monobasic aluminum or lithium salt of 1,2 cyclohexane dicarboxylic acid.

8. Article according claim 1, wherein the nucleating agent is the calcium salt of 1,2 cyclohexane dicarboxylic acid.

9. Article according to claim 1, wherein the composition has a flexural modulus of at least 1200 MPa.

* * * * *